F. C. HAYNES.
SKATE SHARPENER.
APPLICATION FILED AUG. 25, 1910.
1,006,940.　　　　　　　　　　Patented Oct. 24, 1911.
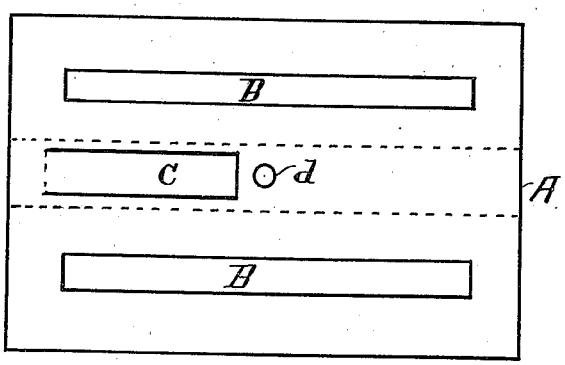
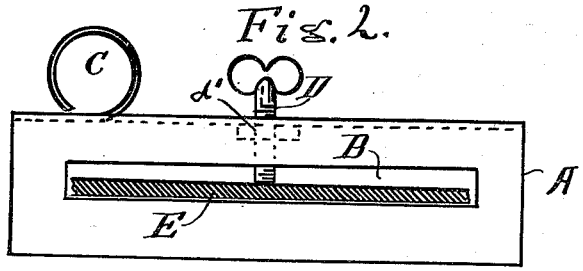
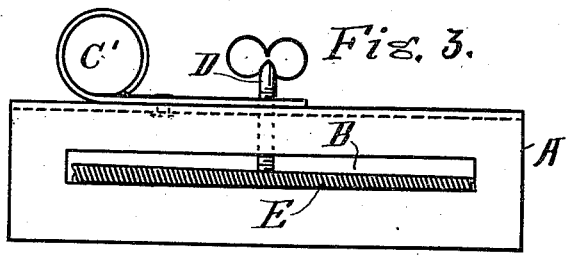
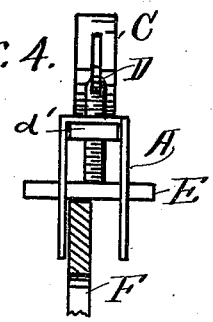
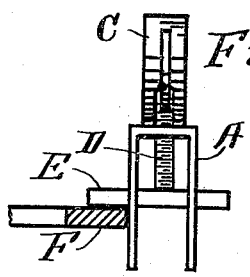
Inventor
Fred C. Haynes

UNITED STATES PATENT OFFICE.

FRED C. HAYNES, OF GRAND RAPIDS, MICHIGAN, ASSIGNOR, BY DIRECT AND MESNE ASSIGNMENTS, TO RICHARD VAN BOCHOVE, OF GRAND RAPIDS, MICHIGAN.

SKATE-SHARPENER.

1,006,940.      Specification of Letters Patent.      Patented Oct. 24, 1911.

Application filed August 25, 1910. Serial No. 578,972.

*To all whom it may concern:*

Be it known that I, FRED C. HAYNES, a citizen of the United States, residing at Grand Rapids, in the county of Kent and State of Michigan, have invented certain new and useful Improvements in Skate-Sharpeners, of which the following is a specification.

My invention relates to improvements in implements for sharpening ice skates, and its object is to provide an implement that will be light, sightly, may be conveniently carried in the pocket, and with which a skate may be readily sharpened or jointed without removing the skate from the foot of the operator. I attain this object by the mechanism and construction shown in the accompanying drawing, in which—

Figure 1 is a plan of the blank from which the implement is made. Fig. 2 is a side elevation of the same showing a handle formed from the body of the implement. Fig. 3 is the same showing a detachable handle. Fig. 4 is an end elevation of the implement showing it as applied for sharpening the edge of a skate, and Fig. 5 is the same showing the implement as applied for jointing the side of a skate iron.

Similar letters refer to similar parts throughout the several views.

I construct this implement from thin sheet metal of practically the form shown in Fig. 1, in which A represents the body portion of the implement and has two slots, as B B cut through it in position so that when the implement is made to the form shown in Figs. 2, 3, 4 and 5, these slots will be upon opposite sides of the implement with the lower edges of the slots upon the same plane so that a file, if placed in the slots as shown in the four last figures, and pressed to place by the set screw D, will be held firmly at right angles with the sides of the implement so that when the implement is passed over the edge of a skate runner or iron, as in Fig. 4, the said edge may, be made to stand exactly at right angles with the side of the runner that bears against the side of the implement, and as these runners always taper to thinner proportions as they approach the body of the skate, this feature of the implement will always insure exactly the proper bevel to the edge of the skate runner. The hand screw D is passed through a small aperture, as $d$, in the top of the implement and, if desired, a nut may be placed within the implement, as indicated at $d'$, to increase the strength of the screw pressure on the file.

To facilitate the handling of this implement I find it well to place a handle, as C or C' upon it. C represents a handle that is made integral with the body of the implement, being cut from the blank, as indicated in Fig. 1, and afterward formed, as shown at C in Fig. 2, while the handle C' is made separate from the body of the implement and may be secured to it by any of the well known appliances used for the purpose.

When the implement is being used for sharpening soft skates I always use a file, as E, for the purpose, but when using it to sharpen very hard skates I find it necessary to use a correspondingly shaped emery plate.

One of the principal advantages gained with this implement is the ability to move the file or sharpening device edgewise and thus be able to use up practically the entire width of it, and another very desirable feature lies in the ability to successfully joint the corner of the skate iron, as indicated in Fig. 5.

Having thus described my invention, what I claim as new, and desire to secure by Letters Patent of the United States, is:

In an implement for sharpening skates, a U formed sheet metal body having a longitudinal slot through each side of the body, said slots being upon the same plane and parallel, a broad flat sharpening element projecting unobstructively laterally through said slots so that it may be used to operate upon the edges and sides of a skate runner.

Signed at Grand Rapids Michigan August 18, 1910.

FRED C. HAYNES.

In presence of—
    I. J. CILLEY,
    A. HANSKNECHT.

Copies of this patent may be obtained for five cents each, by addressing the "Commissioner of Patents, Washington, D. C."